United States Patent [19]

Nakai et al.

[11] Patent Number: 5,230,878
[45] Date of Patent: Jul. 27, 1993

[54] CARBON BLACK FOR TIRE TREAD RUBBER

[75] Inventors: Kiyonari Nakai, Aichi; Fumio Takemura, Gotenba, both of Japan

[73] Assignee: Tokai Carbon Co., Ltd., Tokyo, Japan

[21] Appl. No.: 799,880

[22] Filed: Nov. 27, 1991

Related U.S. Application Data

[60] Division of Ser. No. 636,027, Jan. 4, 1991, abandoned, which is a continuation of Ser. No. 538,620, Jun. 15, 1990, abandoned.

[30] Foreign Application Priority Data

Oct. 2, 1989 [JP] Japan ................................. 1-258056

[51] Int. Cl.$^5$ .............................................. C09C 1/48
[52] U.S. Cl. ................................................ 423/449.1
[58] Field of Search ............... 524/495, 496; 423/445, 423/449.1

[56] References Cited

U.S. PATENT DOCUMENTS

| | | | |
|---|---|---|---|
| 2,632,713 | 3/1953 | Krejci | 423/458 |
| 2,971,822 | 2/1961 | Williams | 422/151 |
| 3,376,111 | 4/1968 | Stegelman | 423/445 |
| 3,523,812 | 8/1970 | Kraus | 423/449 |

(List continued on next page.)

FOREIGN PATENT DOCUMENTS

| | | | |
|---|---|---|---|
| 20705 | 2/1983 | Japan . | |
| 2096542 | 12/1983 | Japan . | |
| 49267 | 3/1984 | Japan . | |
| 1091234 | 5/1986 | Japan . | |
| 1143453 | 7/1986 | Japan . | |
| 1207452 | 9/1986 | Japan . | |
| 2057434 | 3/1987 | Japan . | |
| 62-277446 | 12/1987 | Japan | 423/445 |
| 2290739 | 12/1987 | Japan . | |
| 1201367 | 8/1989 | Japan . | |

OTHER PUBLICATIONS

Tanso, 106 (1981) p. 114, column right, lines 13-18, "Effects of Carbon Black Types on Treadwear of Radial and Bias Tires at Variable Test Severities", C. R. Wilder, J. R. Haws and W. T. Cooper.

W. M. Hess et al., "Specific Shape Characterization of Carbon Black Primary Units", *Rubber Chemistry and Technology*, 1973, pp. 204, 208, 227.

Jean-Baptiste Donnet and Andries Voet, "Carbon Black", *Physics Chemistry and Elastomer Reinforcement*, pp. 200-202. (1985).

ASTM: D2414-88, Standard Test Method for Carbon Black-n-Dibutyl Dibutyl Phthalate Absorption Number, pp. 435-438. (1988).

*Primary Examiner*—Wayne Langel
*Assistant Examiner*—Stuart L. Hendrickson
*Attorney, Agent, or Firm*—Armstrong, Westerman, Hattori, McLeland & Naughton

[57] ABSTRACT

A carbon black of the category of hard carbon blacks having a nitrogen adsorption specific surface area ($N_2SA$) of 120 to 165 m$^2$/g and a DBP absorption number of 120 ml/100 g or more and satisfying requirements respectively represented by the following formulae (1) and (2):

$$\overline{D}st \leq (4.35 \times dn) - 10.0 \qquad (1)$$

$$\frac{\Delta Dst}{\overline{D}st} \times \frac{N_2SA}{IA} \leq 0.58. \qquad (2)$$

In the formulae (1) and (2), dn is the arithmetic average diameter (nm) measured by electron microscopy, $\Delta Dst$ (nm) is the difference between two Stokes diameters each obtained in a frequency of 50% of the maximum frequency in a distribution curve of the aggregate Stokes diameter, $\overline{D}st$ (nm) is the Stokes diameter of the maximum frequency in the distribution curve of the aggregate Stokes diameter, $N_2SA$ is the nitrogen adsorption specific surface area (m$^2$/g) and IA is the iodine adsorption number (mg/g).

1 Claim, 1 Drawing Sheet

U.S. PATENT DOCUMENTS

| | | | |
|---|---|---|---|
| 3,615,211 | 10/1971 | Lewis | 422/151 |
| 3,725,103 | 4/1973 | Jordan et al. | 106/472 |
| 3,830,774 | 8/1974 | Jordan et al. | 260/42.46 |
| 3,864,305 | 2/1975 | Jordon et al. | 423/445 |
| 3,973,983 | 8/1976 | Jordan et al. | 106/307 |
| 3,988,478 | 10/1976 | Wiggins | 423/449 |
| 4,035,336 | 7/1977 | Jordan et al. | 260/42.47 |
| 4,071,496 | 1/1978 | Kraus | 425/445 |
| 4,154,277 | 5/1979 | Sato et al. | 152/209 R |
| 4,228,143 | 10/1980 | Cheng et al. | 423/445 |
| 4,250,145 | 2/1981 | Pobst et al. | 423/450 |
| 4,267,160 | 5/1981 | Kraus et al. | 423/450 |
| 4,289,743 | 9/1981 | Ruble | 423/450 |
| 4,316,881 | 2/1982 | Pobst et al. | 423/450 |
| 4,360,627 | 11/1982 | Okado | 106/307 |
| 4,367,208 | 1/1983 | Glasstetter et al. | 423/449 |
| 4,398,582 | 8/1983 | Yuto | 423/445 |
| 4,438,087 | 3/1984 | Casperson | 423/450 |
| 4,459,273 | 7/1984 | Dolkemeyer et al. | 106/307 |
| 4,477,621 | 10/1984 | Sato et al. | 106/307 |
| 4,478,973 | 10/1984 | Misono et al. | 524/496 |
| 4,486,398 | 12/1984 | Casperson | 423/456 |
| 4,500,672 | 2/1985 | Suzuki et al. | 423/450 |
| 4,503,027 | 3/1985 | Cheng | 423/450 |
| 4,540,560 | 9/1985 | Henderson | 423/450 |
| 4,548,980 | 10/1985 | Nagata et al. | 524/495 |
| 4,550,135 | 10/1985 | Iwama | 524/495 |
| 4,569,834 | 2/1986 | West et al. | 423/460 |
| 4,678,830 | 7/1987 | Sato et al. | 524/495 |
| 4,703,079 | 10/1987 | Ahmad et al. | 524/496 |
| 4,721,740 | 1/1988 | Ida | 524/496 |
| 4,784,973 | 11/1988 | Mito et al. | 423/450 |
| 4,786,677 | 11/1988 | Nakai et al. | 524/496 |
| 4,808,395 | 2/1989 | Yoshimura et al. | 423/456 |
| 4,820,751 | 4/1989 | Takeshita et al. | 524/495 |
| 4,933,107 | 6/1990 | Watanabe | 524/495 |

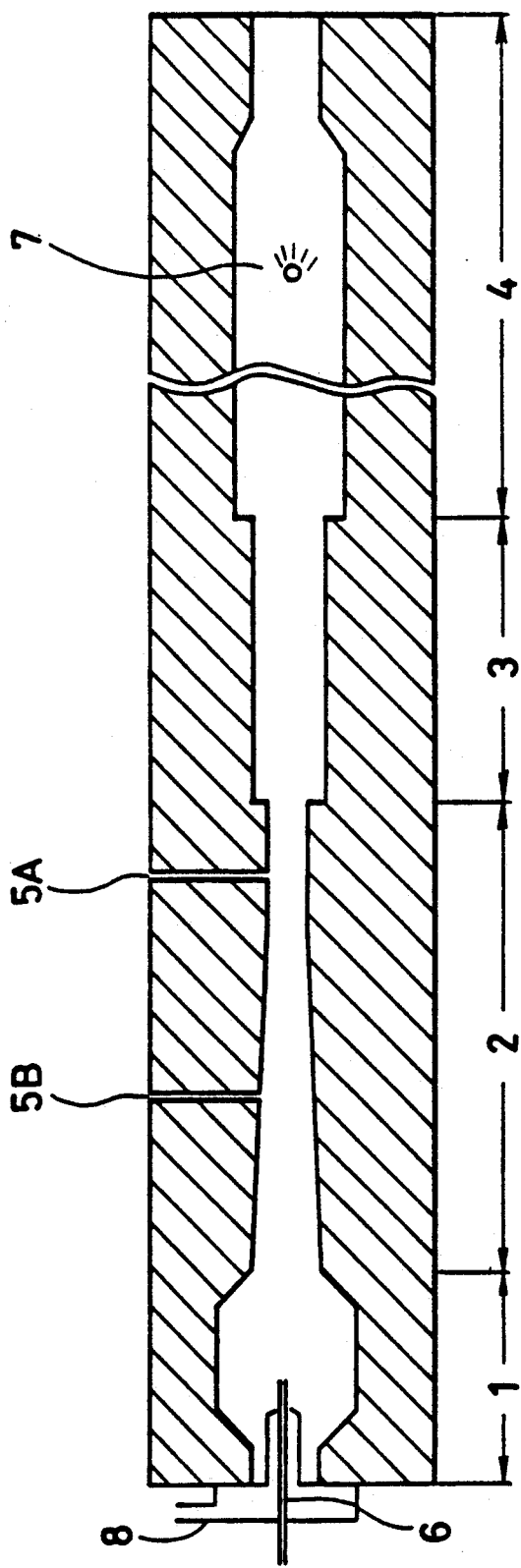

CARBON BLACK FOR TIRE TREAD RUBBER

This application is a division of application Ser. No. 636,027, filed Jan. 4, 1991, abandoned, which in turn is a continuation of Ser. No. 538,620, filed Jun. 15, 1990 now abandoned.

BACKGROUND OF THE INVENTION

The present invention relates to a carbon black for a tire tread rubber capable of imparting an excellent abrasion resistance and traction performance to a rubber component.

In recent years, with an improvement in the performance of automobiles, demands for the performances and ride comfort at high speeds have been increased, and research and development have eagerly been conducted on an improvement in the performance of the tire tread portion.

For this reason, a carbon black for reinforcement of rubber as well has strongly been required to have such characteristics that it can simultaneously impart to a rubber component a high abrasion resistance sufficient to attain ride comfort at high speeds and a high traction performance capable of providing a high grip of the road surface.

The reinforcement of rubber with carbon black has hitherto been thought to be mainly governed by the specific surface area (particle diameter) and structure of the carbon black. In general, the better the above-described characteristics, the larger the increase in the abrasion resistance of the compounded rubber.

The use of SBR having a high styrene content as a rubber component of a tread portion and the compounding of a process oil in high loading are known as means for improving the grip of the road surface.

However, the above-described use of SBR having a high styrene content and compounding of a process oil bring about not only the sufficient improvement in the traction performance but also a remarkable lowering in the abrasion resistance.

In view of the above, the present inventors have forwarded studies on the impartation of a high traction performance to a rubber component without detriment to the high abrasion resistance from various angles in respect of characteristics of carbon black and, as a result, have found that it is effective in attaining this purpose to narrow the aggregate size distribution of carbon black, lower the surface activity and decrease the Stokes diameter of an aggregate size relative to the electron-microscopic average diameter of carbon black, which has led to the completion of the present invention.

SUMMARY OF THE INVENTION

An object of the present invention is to provide a carbon black capable of imparting to a tire tread a high traction performance while maintaining a high abrasion resistance.

The above-described object of the present invention can be attained by a carbon black of the category of hard carbon blacks having a nitrogen adsorption specific surface area ($N_2SA$) of 120 to 165 m$^2$/g and a DBP absorption number of 120 ml/100 g or more and satisfying requirements respectively represented by the following formulae (1) and (2):

$$\overline{D}st \leq (4.35 \times dn) - 10.0 \tag{1}$$

$$\frac{\Delta Dst}{\overline{D}st} \times \frac{N_2SA}{IA} \leq 0.58 \tag{2}$$

wherein dn is the arithmetic average diameter (nm) measured by electron microscopy, $\Delta Dst$ (nm) is the difference between two Stokes diameters each obtained in a frequency of 50% of the maximum frequency in a distribution curve of the aggregate Stokes diameter, $\overline{st}$ (nm) is the Stokes diameter of the maximum frequency in the distribution curve of the aggregate Stokes diameter, $N_2SA$ is the nitrogen adsorption specific surface area (m$^2$/g) and IA is the iodine adsorption number (mg/g).

BRIEF DESCRIPTION OF THE DRAWINGS

FIG. 1 is a schematic cross-sectional view of an example of an oil furnace to be used for the production of the carbon black of the present invention.

PREFERRED EMBODIMENTS OF THE INVENTION

Among the characteristics of carbon black specified in the present invention, a nitrogen adsorption specific surface area ($N_2SA$) of 120 to 165 m$^2$/g and a DBP absorption number of 120 ml/100 g or more are characteristics of a hard carbon black equivalent to a usual carbon black, such as SAF (N110) and ISAF (N220), and necessary to impart a high abrasion resistance to a compounded rubber.

When the nitrogen adsorption specific surface area ($N_2SA$) and DBP absorption number are less than 120 m$^2$/g and less than 120 ml/100 g, respectively, it becomes impossible to impart a high abrasion resistance to a tire tread. When the nitrogen adsorption specific surface area ($N_2SA$) exceeds 165 m$^2$/g, the dispersion of the carbon black in the rubber is remarkably deteriorated.

The property of a carbon black particle represented by the following formula (1) is characterized in that the Stokes diameter ($\overline{D}st$) of an aggregate relative to the electron-microscopic average diameter (dn) is small. This property is thus a characteristic factor which contributes mainly to an increase in the abrasion resistance.

$$\overline{D}st \leq (4.35 \times dn) - 10.0 \tag{1}$$

The selective characteristics represented by the following formula (2) is characterized by narrow aggregate size distribution ($\Delta Dst/\overline{D}st$) and low surface activity ($N_2SA/IA$) and serves to improve the traction performance.

$$\frac{\Delta Dst}{\overline{D}st} \times \frac{N_2SA}{IA} \leq 0.58 \tag{2}$$

When not only the above-described prerequisite but also the selective characteristics requirements represented by the above-described formulae (1) and (2) are satisfied, it becomes possible to simultaneously impart a high abrasion resistance and a high traction performance to a compounded rubber. However, when the $\overline{D}st$ (nm) exceeds the value calculated by the formula, [$4.35 \times dn$]$-10.0$], the abrasion resistance remarkably lowers, and when [$\Delta Dst/\overline{D}st \times N_2SA/IA$] exceeds 0.58, no sufficient traction performance can be imparted. In both of the above cases, the tire tread performance intended in the present invention cannot be attained.

The function of the carbon black of the present invention will now be described.

In order to impart a high abrasion resistance to a rubber component, it is effective to reduce the average particle diameter (dn) measured by electron microscopy as much as possible and, at the same time, to enhance the DBP absorption number. However, an increase in the DBP absorption number makes the aggregate relatively large, which inevitably brings about an increase in the Stokes diameter of the aggregate.

However, when the DBP absorption number is 120 ml/100 g or more, the carbon black effectively serves to impart a high abrasion resistance if Dst satisfies the requirement represented by the formula (1).

In respect of an improvement in the traction performance, the carbon black effectively functions for this purpose when the requirement represented by the formula (2) for narrowing the aggregate size distribution while maintaining a relatively small Stokes diameter of the aggregate and, at the same time, suppressing the surface activity of the carbon black is satisfied.

The above-described mutual mechanism synergistically acts together with the prerequisite characteristics, i.e., a nitrogen adsorption specific surface area ($N_2SA$) of 120 to 165 $m^2/g$ and a DBP absorption number of 120 ml/100 g or more, to bring about an effect of simultaneously imparting a high abrasion resistance and a high traction performance required of a tire tread rubber.

The various characteristics of the carbon black according to the present invention are measured by the following methods.

(1) Nitrogen adsorption specific surface area ($N_2SA$):

It is determined by ASTM D3037-86 "Standard Test Methods of Testing Carbon Black-Surface Area by Nitrogen Adsorption", Method B. The nitrogen adsorption specific surface area ($N_2SA$) of Industry Reference Blacks (IRS)#5 found by this method is 80.3 $m^2/g$.

(2) DBP absorption number:

It is measured according to JIS K6221 (1975) "Testing Methods of Carbon Black for Rubber Industry", Section 6.1.2, Adsorption Number A Method.

(3) Electron-microscopic average particle diameter (dn):

A carbon black sample was dispersed in chloroform for 30 minutes in an ultrasonic cleaning machine at a frequency of 28 kHz, and the dispersed sample was fixed on a film on a specimen grid for supporting carbon.

This sample had its micrograph taken by an electron microscope (direct magnification ×20,000; total magnification 80,000 to 100,000). Above 1,000 randomly selected carbon black particles in the electron micrograph were measured for their diameters. Then, the arithmetical mean particle diameter (dn) was determined from a 3-nm interval histogram of the diameters.

(4) $\overline{D}st$, $\Delta Dst$:

A carbon black sample is dried according to JIS K6221 (1975), Section 6.2.1, Method A. The dried carbon black sample is accurately weighed out and dispersed into a 20% aqueous solution of ethanol containing a small quantity of a surface active agent (dispersing agent) to prepare a dispersion of carbon black in a concentration of 50 mg/l. Complete dispersion is accomplished ultrasonically.

Then, the dispersion is subjected to centrifugal classification by a disk centrifuge (made by Joyes Loebl Co., England) set to 8000 rpm. 10 to 20 ml of spin liquid (2% aqueous solution of glycerin) is added and then 1 ml of buffer (aqueous solution of ethanol) is added. Finally, 0.5 to 1.0 ml of the dispersion of carbon black is added by means of a syringe. Centrifugation is started. Simultaneously, the recorder is also started to draw a distribution curve of aggregate Stokes diameter. The Stokes diameter of the maximum frequency in the distribution curve thus prepared is defined as $\overline{D}st$ (nm), and the difference between two Stokes diameters each obtained in a frequency of 50% of the maximum frequency is defined as $\Delta Dst$ (nm). The $\overline{D}st$ and $\Delta Dst$ of ASTM D-24 Standard Reference Black C-3 (N234) measured by the above-described method are 80 nm and 60 nm, respectively.

(5) Iodine adsorption number:

This value was determined according to the testing method for rubber-compounding carbon black, JIS K6221-82, Article 6.1.1, corresponding to ASTM D1510-81.

The carbon black of the present invention having the aforementioned characteristic properties can be produced by controlling various conditions, such as reaction temperature, fuel gas flow rate and residence time for reaction, using, for example, an oil furnace as shown in FIG. 1. This oil furnace comprises an air feed inlet 8 in the tangential direction thereof, a combustion chamber 1 provided with a fuel burner 6, first and second reaction chambers 2 and 3 extending from the combustion chamber 1, and a broad reaction chamber 4 extending from the reaction chamber 3 and provided therein with a cooling water spray nozzle 7.

A main feedstock oil is introduced into the smallest-diameter portion 5A of the first reaction chamber, while an auxiliary feedstock oil is introduced into a position 5B before the feed point of the main feedstock oil where the combustion gas flows at a lower rate than that of the feed point of the main feedstock oil. They are separately introduced in a direction normal to the combustion gas stream. Thus, the carbon black of the present invention is produced.

In this case, it is more effective to use a light hydrocarbon oil as the auxiliary feedstock oil for the purpose of more homogenizing the temperature distribution of a high temperature combustion gas immediately before the introduction of the main feedstock oil and, at the same time, enhancing the injection pressure of the main feedstock oil to intrude the main feedstock oil to the central portion of the furnace, thereby causing them to come into collision with each other.

According to a customary method, the carbon black of the present invention may be compounded into natural rubber, styrene-butadiene rubber, polybutadiene rubber, isoprene rubber, butyl rubber and various other elastomers such as various synthetic rubbers and blended rubbers which can be reinforced with ordinary carbon blacks. The compounding amount of the carbon black is 25 to 150 parts by weight based on 100 parts by weight of the rubber component, and the carbon black may be compounded together with any other necessary ingredients such as a vulcanizing agent, a vulcanization accelerator, an age resister, a vulcanization aid, a softener and a plasticizer, to provide a rubber composition for tire treads.

Examples of the present invention will now be described together with Comparative Examples.

EXAMPLES 1 TO 3 AND COMPARATIVE EXAMPLES 1 TO 4:

(1) Production of carbon black

As shown in FIG. 1, there was provided an oil furnace comprising connectively provided elements, i.e., a combustion chamber 1 (a diameter of 500 mm; a length of 1000 mm) provided on a furnace head portion and equipped with a tangential air feed port 8 and a fuel burner 6 fitted in the direction of the furnace axis; a first reaction chamber 2 (an inlet diameter of 250 mm; a diameter of 150 mm at the smallest-diameter portion; a taper length of 1000 mm; a length of 300 mm at the smallest-diameter portion) which is coaxially connected to the combustion chamber and gently converged; a second reaction chamber 3 (a diameter of 200 mm; a length of 1000 mm); and a rear larger-diameter reaction chamber 4 having a diameter of 400 mm and a length of 6000 mm. A main feedstock oil nozzle 5A was provided on the smallest-diameter portion of the above-described reaction chamber, and a feedstock oil nozzle 5B was provided at a position of the large-diameter taper where it is located before the main feedstock oil nozzle and where the combustion gas flow rate becomes about ½, in such a manner that the direction of introduction of the auxiliary feedstock oil is normal to the combustion gas stream. Numeral 7 designates a position for water cooling of a formed gas.

An aromatic hydrocarbon oil having a specific gravity of 1.137 (15.4° C.), a toluene insoluble content of 0.05%, a Bureau of Mines Correlation Index (BMCI) of 162, an initial boiling point of 203° C., a sulfur content of 0.51%, a Na+content of 1.0 ppm and a K+content of 0.3 ppm was used as a main feedstock oil, and a light hydrocarbon oil having a specific gravity of 0.977 (15/4° C.), a toluene insoluble content of 0.01%, a coefficient of correlation (BMCI) of 111, an initial boiling point of 133° C., a sulfur content of 0.09%, a Na+content of 1.7 ppm and a K+content of 0.6 ppm was used as an auxiliary feedstock oil. The fuel oil was the same as the auxiliary feedstock oil.

Carbon blacks (three kinds) of the present invention having characteristics falling within the scope of the present invention were prepared by making use of the above-described reaction furnace, feedstock oil, and fuel oil under generation conditions specified in Table 1.

TABLE 1

| Condition | Ex. No. 1 | Ex. No. 2 | Ex. No. 3 |
|---|---|---|---|
| total air feed rate (Nm³/hr) | 4800 | 5150 | 5500 |
| fuel oil feed rate (kg/hr) | 294 | 316 | 337 |
| fuel oil combustion rate (%) | 160 | 160 | 160 |
| auxiliary feedstock oil feed rate (kg/hr) | 200 | 145 | 260 |
| main feedstock oil feed rate (kg/hr) | 945 | 1040 | 835 |
| gas temperature at main feedstock oil introducing portion[1] (°C.) | 1810 | 1890 | 1780 |
| temperature distribution at the introducing portion[2] (°C.) | 110 | 80 | 140 |
| combustion air temperature (°C.) | 600 | 650 | 600 |
| main feedstock oil injection pressure (kg/cm²) | 17.5 | 18.0 | 16.5 |
| reaction ressidence time[3] (msec) | 19.3 | 16.1 | 15.1 |

Notes:
1. The maximum gas temperature of a portion immediately before the main feedstock oil introducing portion
2. The difference between the maximum temperature and the minimum temperature of the main feedstock oil introducing portion
3. Residence time taken for the formed gas to reach the water cooling point Various characteristics of the carbon blacks thus prepared under conditions specified in Table 1 are given in Table 2.

In Table 2, carbon blacks of Comparative Examples 1 to 4 are each a hard one having a nitrogen adsorption specific surface area ($N_2SA$) and a DBP absorption number each falling within the scope of the present invention but has such characteristics that the requirements represented by the formulae (1) and (2) are not satisfied.

TABLE 2

| Characteristics | Ex. No. 1 | Ex. No. 2 | Ex. No. 3 | Comp. Ex. No. 1 | Comp. Ex. No. 2 | Comp. Ex. No. 3 | Comp. Ex. No. 4 |
|---|---|---|---|---|---|---|---|
| $N_2SA$ (m²/g) | 125 | 148 | 162 | 128 | 133 | 142 | 150 |
| DBP (ml/100 g) | 131 | 123 | 138 | 135 | 133 | 131 | 132 |
| ΔDst (nm) | 42 | 35 | 34 | 49 | 47 | 44 | 47 |
| D̄st (nm) | 70 | 63 | 61 | 79 | 73 | 75 | 72 |
| dn (nm) | 19.1 | 18.4 | 17.1 | 19.8 | 19.5 | 19.0 | 18.4 |
| IA (mg/g) | 135 | 144 | 160 | 131 | 129 | 146 | 152 |
| [(4.35 × dn) − 10.0] | 73.1 | 70.0 | 64.4 | 76.1 | 74.8 | 72.7 | 70.0 |
| $\left\{ \dfrac{\Delta Dst}{\overline{Dst}} \times \dfrac{N_2SA}{IA} \right\}$ | 0.556 | 0.571 | 0.564 | 0.606 | 0.664 | 0.571 | 0.644 |

(2) Compounding with rubber

Then, the carbon blacks listed in Table 2 were each compounded with an oil-extended rubber in a compounding ratio specified in Table 3.

TABLE 3

| Compounding components | Parts by weight |
|---|---|
| oil-extended SBR (rubber extended with 37.5 parts of oil) | 137.5 |
| carbon black | 70.00 |
| stearic acid (dispersion vulcanization aid) | 1.00 |
| zinc oxide (vulcanization aid) | 3.00 |
| N-cyclohexyl-2-benzothiazolesulfenamide (vulcanization accelerator) | 1.50 |
| sulfur (vulcanizing agent) | 1.75 |

The compounds listed in Table 3 were vulcanized at a temperature of 145° C. to prepare rubber compositions. Each composition was subjected to measurements of various rubber characteristics. The results are given in Table 4.

Among the rubber characteristics, the abrasion loss, hysteresis loss and dynamic modulus of elasticity were measured by making use of the following methods and conditions. Other characteristic properties than the above ones were measured according to JIS K6301 "Physical Testing Methods for Vulcanized Rubber".

The traction performance was evaluated by making use of the hysteresis loss (tan δ) as an index. The larger the value, the better the improvement in the traction performance.

(1) Abrasion Loss:

Abrasion loss was measured with a Lambourn abrasion tester (with mechanical slip mechanism) under the following conditions:

Test piece: 10 mm in thickness and 44 mm in outside diameter
Emery wheel: GS type; grain size: #80; hardness: H
Carborundum added: grain size: #80; adding rate: approximately 9 g/min
Relative slip ratio of Emery wheel surface to Test piece: 24%, 60%
Speed of revolution of test piece: 535 rpm
Load on test piece: 4 kg (2) Hysteresis Loss (tan δ) and Dynamic Modulus Elasticity (E'):

Hysteresis loss was measured by a viscoelastic spectrometer (manufactured by Iwamoto Seisakusho Co.) under the following conditions.

Test piece: 35 mm long, 5 mm wide, 2 mm thicken
Frequency: 50 Hz
Temperature: 25° C.
Dynamic strain (amplitude): 1.2% the traction performance while maintaining a high abrasion resistance on the same level as that of the Comparative Examples having a comparable particle diameter, and further exhibit a dynamic modulus of elasticity (E') indicative of the driving stability.

As described above, the carbon black of the present invention enables a high abrasion resistance and a high traction performance to be imparted to a compounded rubber through a unique particle property. Therefore, it satisfies various performance requirements when used as a carbon black for a tire tread rubber where the performances and ride comfort at high speeds are required.

What is claimed is:

1. A carbon black of the category of hard carbon blacks having a nitrogen adsorption specific surface area ($N_2SA$) of 120 to 165 $m^2/g$ and a DBP absorption number of 120 ml/100 g to 138 ml/100 g and satisfying requirements respectively represented by the following formulae (1) and (2):

$$\overline{D}st \leq (4.35 \times dn) - 10.0 \quad (1)$$

$$\frac{\Delta Dst}{\overline{D}st} \times \frac{N_2SA}{IA} \leq 0.58 \quad (2)$$

wherein dn is the arithmetic average diameter (nm) measured by electron microscopy, $\Delta Dst$ (nm) is the difference between two Stokes diameters each obtained in a frequency of 50% of the maximum frequency in a distribution curve of the aggregate Stokes diameter, $\overline{D}st$ (nm) is the Stokes diameter of the maximum frequency in the distribution curve of the aggregate Stokes diameter, $N_2SA$ is the nitrogen adsorption specific surface area ($m^2/g$) and IA is the iodine adsorption number (mg/g).

TABLE 4

| Characteristics | Ex. No. 1 | Ex. No. 2 | Ex. No. 3 | Comp. Ex. No. 1 | Comp. Ex. No. 2 | Comp. Ex. No. 3 | Comp. Ex. No. 4 |
| --- | --- | --- | --- | --- | --- | --- | --- |
| abrasion resistance LA24 (ml/5 min) | 0.1070 | 0.0983 | 0.1005 | 0.1081 | 0.1058 | 0.1068 | 0.1022 |
| LA60 (ml/min) | 0.0962 | 0.1012 | 0.0980 | 0.0975 | 0.1038 | 0.1025 | 0.0995 |
| hysteresis loss (tan δ) | 0.472 | 0.498 | 0.511 | 0.451 | 0.438 | 0.490 | 0.481 |
| dynamic modulus of elasticity E' ($\times 10^8$ dyn/$cm^2$) | 1.271 | 1.324 | 1.379 | 1.274 | 1.290 | 1.332 | 1.360 |
| hardness (Hs) | 70 | 71 | 71 | 69 | 69 | 70 | 70 |
| 300% modulus (kg/$cm^2$) | 105 | 98 | 97 | 99 | 90 | 92 | 94 |
| tensile strength (kg/$cm^2$) | 290 | 315 | 346 | 280 | 273 | 303 | 321 |
| elongation (%) | 510 | 560 | 560 | 580 | 660 | 630 | 610 |

As is apparent from the results given in Table 4, the Examples of the present invention exhibit a significant improvement in the hysteresis loss (tan δ) indicative of

* * * * *